Feb. 13, 1945.    L. G. EHMANN    2,369,344
LOCKING DEVICE FOR LOAD SUPPORTING PINS
Filed April 21, 1941    2 Sheets-Sheet 1

LESLIE G. EHMANN
INVENTOR
BY
ATTORNEY

Feb. 13, 1945.     L. G. EHMANN     2,369,344
LOCKING DEVICE FOR LOAD SUPPORTING PINS
Filed April 21, 1941     2 Sheets-Sheet 2
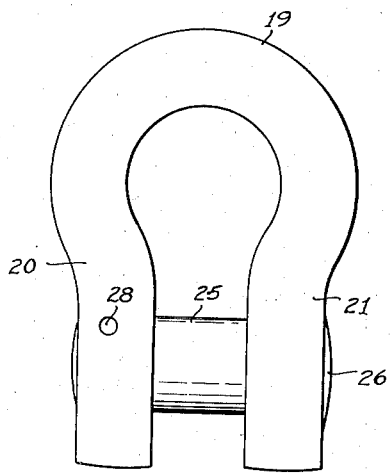
Fig. 6
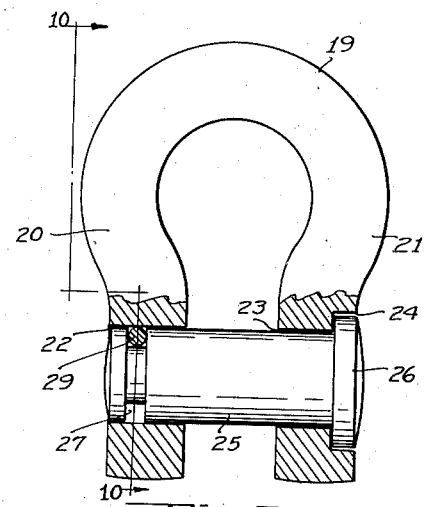
Fig. 7
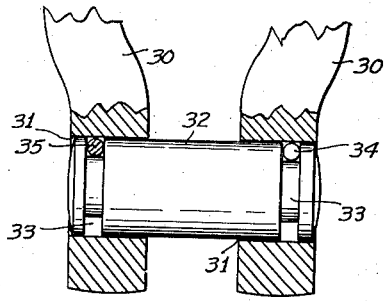
Fig. 8
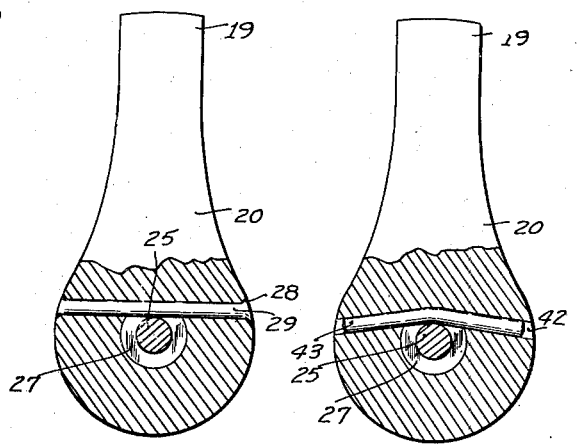
Fig. 10     Fig. 11
Fig. 9
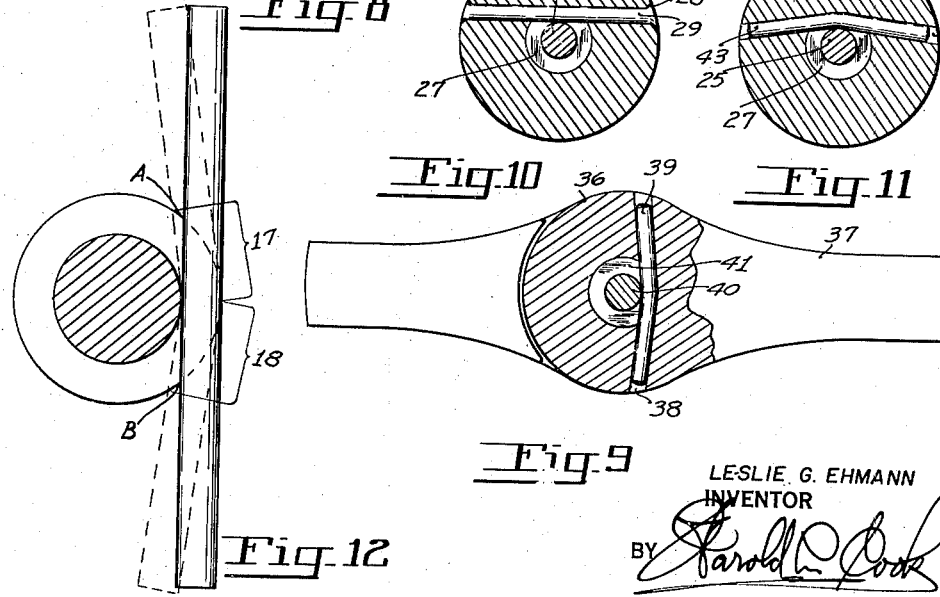
Fig. 12
LESLIE G. EHMANN
INVENTOR
BY *Harold Cook*
ATTORNEY Patented Feb. 13, 1945

2,369,344

UNITED STATES PATENT OFFICE 2,369,344

LOCKING DEVICE FOR LOAD SUPPORTING PINS

Leslie G. Ehmann, Portland, Oreg., assignor to Electric Steel Foundry Company, Portland, Oreg., a corporation of Oregon Application April 21, 1941, Serial No. 389,613

16 Claims. (Cl. 59—86)

This invention relates to an improved locking device for a load supporting pin, such as is used in shackles, repair links and the like, and has particular reference to a locking device for load supporting pins mounted in elements having aligned openings and which are designed for rotation on the pin.

In certain fields of use, as, for example, in hinge-type repair links comprising a pair of members having aligned openings and having a pin through said openings to pivotally connect the members together, the load supporting or connecting pin has heretofore been riveted in countersinks in the outer ends of the aligned openings. In heavy duty chains the connecting pins are so large that to assemble the link and rivet a pin in working position, or to remove a riveted pin when the link is to be disassembled, is a time consuming task requiring special tools, and requires transportation of either the chain or the tools to a place convenient for such operations. The present invention provides a novel form of locking means for retaining the load supporting pin in working position, and provides a simple, easily manipulated device which may be inserted in place and be removed therefrom with the aid of simple tools such as a hammer and punch.

It is a primary object of the invention to provide, in a mechanism having a load supporting pin mounted in aligned openings, a locking device for retaining the pin in working position, and so constructed as to permit rotation of said mechanism on said pin.

It is a further object of the invention to provide, in a mechanism having a load supporting pin mounted in aligned openings, a novel locking device for retaining the pin in working position, said locking device being removable with the use of a hammer and punch to release the pin.

It is a further object of the invention to provide a simple, easily manipulated means for retaining a load supporting pin in working position, and which, though being readily removable to disengage the pin, is not likely to be removed by accidental causes.

It is a further object of the invention to provide, in a mechanism having a load supporting pin mounted in aligned openings, a locking pin for retaining the load supporting pin in working position, and means for greatly increasing the area of shear of the locking pin.

With these and other objects and advantages in mind, the invention resides in the novel construction and combination of parts hereinafter described, illustrated in the accompanying drawings, and set forth in the appended claims; it being understood that various changes within the scope of the claims may be resorted to without departing from the spirit or sacrificing any of the advantages of the invention.

In the drawings:

Figure 6 is a plan view of a shackle embodying the principles of the invention.

Figure 7 is a plan view of a shackle, partly in section, showing the head of the load supporting pin recessed in one arm of the shackle, and showing the means for locking the load supporting pin in working position.

Figure 8 is a fragmentary sectional view similar to Figure 7, illustrating means for retaining in working position in a shackle a load supporting pin of slightly different construction.

Figure 9 is a side elevation of a chain repair link similar to Figure 3, showing a modified construction of the locking pin.

Figure 10 is a side elevation of a shackle, taken on the line 10—10 of Figure 7.

Figure 11 is a side elevation of a shackle similar to Figure 10, showing an application of the modified form of locking pin illustrated in Figure 9.

Figure 12 is a sectional view of a load supporting pin, taken on a line through the peripheral groove, and showing the lines of shear of the retaining pin.

Figure 1:
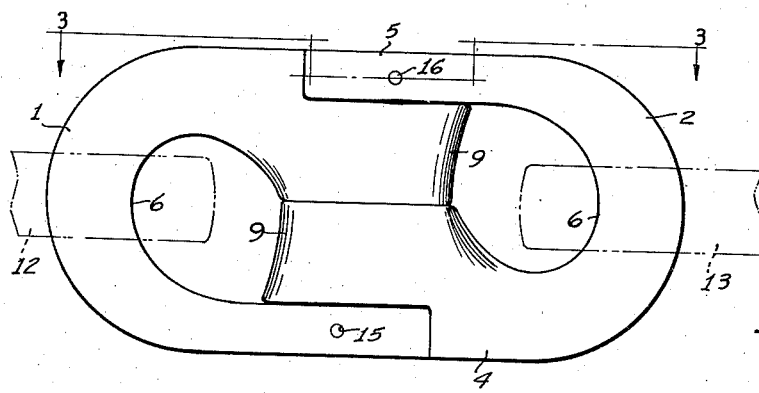
Figure 1 is a plan view of a chain repair link embodying the principles of applicant's invention.
Figure 2:
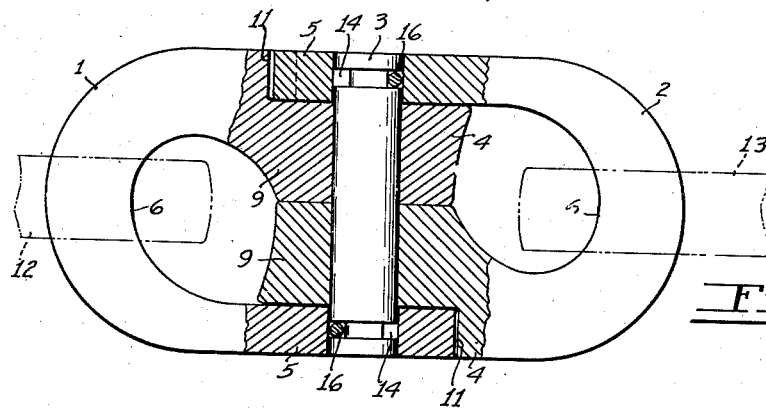
Figure 2 is a plan view, partly in section, of the link shown in Figure 1, showing the means for retaining the load supporting pin in operative relation with the other parts of the link.
Figure 3:
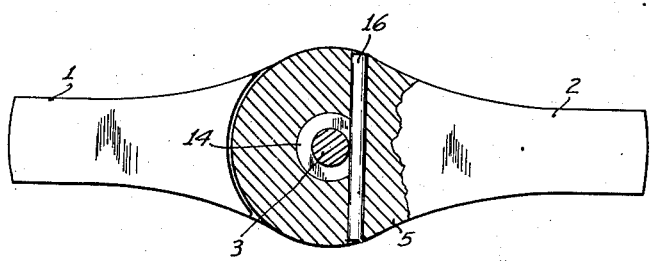
Figure 3 is a side elevation of the link, taken on the line 3—3 of Figure 1, showing the position of the locking pin.

The chain repair link illustrated in Figures 1, 2 and 3 of the drawings is composed of two U-shaped members 1 and 2 pivotally connected together by means of a load supporting pin 3. Each of these U-shaped members 1 and 2 is structurally designed as a hook having a shank 4 and an end portion 5 defining a load supporting eye 6. The shank 4 and the end portion 5 are provided with aligned openings 7 and 8, respectively, to receive the pin 3. The shank 4 and the end portion 5 constitute arms of a U whereby the members 1 and 2 may be termed U-shaped members.

It will be noted that the shank 4, constituting one of the arms of the said U, is provided with an enlarged end portion 9 deformed or offset towards the other arm 5. This provides a typical hook structure in which the enlarged end portion 9 is approximately in the line of tension when a load is applied to the bight of the hook. The offset end portion 9 provides a recess 11 of a size which will accommodate the end portion 5 of the companion member. Thus the two members fit together in smooth, symmetrical relationship with the enlarged end portions 9 of the shanks 4 approximately in the line of tension when the link is loaded, and with the small arms 5 in overlapping relation to the large end portions 9. The solid chain links 12 and 13, indicated by dotted lines in Figures 1 and 2, illustrate how the large end portions 9 lie approximately in the line of tension.

Figure 5:
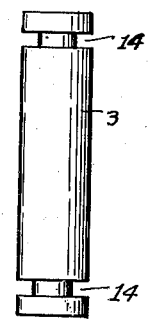
Figure 5 is a side elevation of the load supporting pin.
Figure 4:
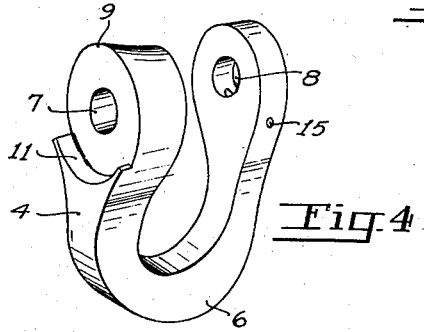
Figure 4 is a perspective view of one of the U-shaped members comprising the link.

In certain fields of usefulness for the type of repair link hereinabove described, the links are of considerable size, the diameter of the metal at each bight 6 being two and one-half inches and greater. In heavy duty links the load supporting pin 3 is of such size that when it is to be riveted in working position or the link disassembled, the task is a time consuming one requiring special tools. The present invention provides means for securing the load supporting pin 3 in working position which may easily be inserted in place and be removed with the aid of simple tools such as a hammer and punch. In one form of the device, as illustrated in Figures 2 and 5, the load supporting pin 3 is provided with a peripheral groove 14 adjacent each of its ends, and each of the arms 5 is provided with a hole 15 transversely of the arm in alignment with one of the grooves 14 when the load supporting pin 3 is in working position. A retaining pin 16 is insertable through each of the holes 15 and through the grooves 14 and functions to retain the load supporting pin 3 in working position. The depth of the annular groove 14 is substantially equal to the diameter of the retaining pin 16. Reference to Figure 3 will reveal that the two end portions of the retaining pin 16 are received entirely within the solid portion of the arms 5, and that the central portion of the retaining pin 16 engages the load supporting pin 3 in the groove 14, and that the arms 5 and load supporting pin 3 together have bearing upon substantially the full length of the pin 16. This arrangement insures that the pin 16 is loaded in double shear. In other words, before the load supporting pin 3 can accidentally be displaced from the aligned openings 7 and 8 by reason of failure of the pin 16, there must be failure in the two lines of shear 17 and 18. (See Figure 12.) A particular advantage of the construction just described is that insertion of the pin 16 through the arms 5 and into engagement with the pin 3 through the grooves 14—14 effectively prevents spreading of the link under load. It will be appreciated that when used for anchor chains and the like, this feature is of primary importance.

It will be noted that the pins 16 are received entirely within the arms 5 and, by reason of this design, are not subject either to wear or to accidental blows which would otherwise tend to dislodge the pins 16 from the link. Preferably, however, the ends of the pin 16 are upset to prevent its accidental removal from the link. Each pin 16 extends through grooves 14 which extend peripherally of the load supporting pin 3, thus providing for rotatability of the load supporting pin 3 in the aligned openings 7 and 8 or rotation of the U-shaped members 1 and 2 about the pin 3. There is, therefore, no interference with the articulation of the U-shaped members. The pin 16 may be removed from the hole with the aid of a punch and hammer.

The device illustrated in Figures 6 and 7 comprises a shackle 19 having arms 20 and 21 provided at their extremities with aligned openings 22 and 23. Both openings 22 and 23 are of generally circular form, the opening 23 being enlarged at its outer end as shown at 24. The shackle 19 is provided with a load supporting pin 25 comprising a generally cylindrical shank having an enlarged head 26 on one end thereof. Adjacent the end of the pin opposite the head 26 is a peripheral groove 27, and transversely of the arm 20, in alignment with the groove 27 when the pin 25 is in working position, is a hole 28. A retaining pin 29 is insertable through the hole 28 and through the groove 27. The ends of the pin are received entirely within the solid portions of the arm 20, whereas the central portion of the pin 29 extends through the groove 27 and functions to retain the load supporting pin 25 in working position. The pin 29 extends through the groove 27 on a tangent of the arc of the peripheral groove, and does not interfere with rotation of the load supporting pin 25 in the aligned openings 22 and 23.

Figure 8 illustrates a pair of elements 30—30 having aligned circular openings 31—31 and having a load supporting pin 32 mounted for rotation therewithin. Adjacent each end of the pin 32 is a peripheral groove 33, and each of the elements 30 is provided with a hole 34 transversely thereof in alignment with one of the grooves 33 when the load supporting pin 32 is in working position. A retaining pin 35 is insertable through each said hole 34 and one of the grooves 33 to retain the load supporting pin 32 in working position.

In the form of the device illustrated in Figure 9, the arm 36 of the U-shaped member 37 is provided with an opening 38 transversely of the arm, each end of the opening begin inclined from the other end of the opening so that a pin 39, inserted therethrough, is caused to follow in part the arc of the peripheral groove 41 in the pin 40. It will be appreciated that a pin 39 inserted in the opening 38 must of necessity bend out of a straight line to follow through the opening 38, and that once inserted therein it would require the application of a hammer and punch to dislodge the pin 39 sufficiently to permit withdrawal of the load supporting pin 40.

In the form of the device illustrated in Figure 11, the arm 20 of the shackle 19 is provided with an opening 42 transversely of the arm, each end of the opening being inclined from the other end of the opening and intersecting the arc of the peripheral groove 27 in the load supporting pin 25. A pin 43 inserted through the opening 42 bends out of a straight line to follow the opening. However, the opening 42 does not follow the arc of a circle and the pin 43 may be removed therefrom only with the aid of a punch and hammer or similar tools.

An advantage of the invention lies in the provision of the greatly increased area of shear of the retaining pin. The two lines of shear 17 and 18 are represented by that portion of the retaining pin between the points of its intersection with the groove in the load supporting pin. The area of shear is the area of the segment on the chord AB, and it will be appreciated that this area is further increased as the retaining pin is caused to be inclined from a straight line, as indicated in dotted lines in Figure 12.

Although described herein as applied to a repair link and shackle, applicant's invention is not limited to use therewith, as it has utility in general wherever means is required to fasten a load supporting pin or shaft in aligned openings, and especially where rotation of the pin or shaft is a desired characteristic of the construction.

Having now described my invention and in what manner the same may be used, what I claim as new and desire to protect by Letters Patent is:

1. A locking device for a load supporting pin in a chain repair link and the like, comprising a pair of U-shaped members, each member having a large arm and a small arm, aligned openings in the ends of said arms, a pin through said openings to connect said members together, said large arms carrying the mid portion of said pin and said small arms carrying the end portions of said pin, said pin having a peripheral groove adjacent each of its ends, and a retaining pin extending through each of the small arms of said members and through one of said grooves for retaining said first named pin in said link.

2. A locking device for a load supporting pin, comprising a pair of U-shaped members, each of said members having two arms and aligned openings in the ends of said arms, a pin through said openings to connect said members together, said members being disposed on said pin so that one arm of each member is included between the two arms of the other member, said pin having a peripheral groove adjacent each of its ends, and a retaining pin extending through the outermost arms of each said member and through one of said grooves for retaining said pin in said aligned openings and for preventing said members from spreading under load.

3. A locking device for a load supporting pin, comprising a member having two arms and aligned openings in the ends of said arms, a load supporting pin through said openings, an annular groove peripherally of said pin, means defining an opening transversely of one of said arms in alignment with said groove when said pin is in working position, said opening being inclined from a straght line and following in part the arc of said groove, and a pin insertable through said opening in engagement with said groove for retaining said first named pin in working position while permitting free rotative movement of said first pin within said openings.

4. An article of manufacture comprising a load supporting arm, means defining a cylindrical opening through said arm, a cylindrical load supporting pin extending through said opening, parallel walls extending entirely around said pin defining an annular groove in the surface of said load supporting pin, the width of said groove being substantially equal to the depth thereof, means defining a second relatively small opening through said arm at right angles with respect to said first opening and intersecting said first opening adjacent a side wall thereof, said second opening communicating with said first opening substantially throughout the full cross section of said second opening, the diameter of said second opening being substantially equal to the cross sectional area of said groove, a retaining pin arranged through said second opening and through said groove whereby said load supporting pin is retained in a predetermined axial relation within said arm irrespective of the angular relation thereof with respect to said arm, said arm and said load supporting pin being adapted for relative rotation with said pin in working position, said arm and said load supporting pin together bearing upon said retaining pin throughout the full length.

5. An article of manufacture comprising a member having a first opening therethrough, a load supporting pin extending cooperatively through said opening, means defining an annular groove in the outer surface of said pin, means defining a pair of relatively small openings extending through said member in a common plane at right angles with respect to said first opening, said last mentioned openings communicating with said first opening adjacent a side wall thereof and at a slight angle with respect to each other, the inner ends of said small openings being aligned with each other, a retaining pin inserted through said small openings and through said groove, said second pin being deformed upon being driven through said angularly disposed small openings whereby it is retained in position due to the deformation thereof.

6. An article of manufacture comprising a member having a first relatively large opening therethrough, a load supporting pin extending through said opening, means defining an annular groove in said pin, means defining a pair of relatively small openings through said member lying in a common plane at right angles with respect to said first opening and communicating with said first opening throughout substantially the full diameter of said small openings, the inner ends of said small openings being aligned with respect to each other adjacent a side wall of said first opening, said second openings being disposed at a slight angle with respect to each other, a retaining pin driven through said small openings and extending through said groove in said load supporting pin, said retaining pin being deformed as it is driven through said angularly disposed small openings whereby it is retained in position due to the deformation thereof.

7. An article of manufacture comprising a member having a first relatively large opening therethrough, a load supporting pin extending through said opening, means defining an annular groove in the surface of said load supporting pin, means defining a pair of relatively small second openings extending through said member at right angles with respect to said first opening and communicating with said first opening, said pair of openings being disposed at a slight angle with respect to each other, a retaining pin driven through said second opening and through said groove, the angular relation between said second openings being such that said retaining pin follows in part the arc of said groove, said retaining pin being retained in said second openings due to the deformation thereof as it is driven through said second openings.

8. A locking device for a load supporting pin, comprising a pair of members having arms and aligned openings in the ends of said arms, a pin insertable through said openings for connecting said members together, parallel walls extending entirely around said pin defining an annular groove peripherally of said pin, one of said arms being provided with a hole therethrough in alignment with said groove when said pin is in working position, and a retaining pin insertable through said arm and into said groove and extending tangentially of said groove for retaining said first named pin in working position irrespective of the angular position of said pin in said openings.

9. A locking device for a load supporting pin, comprising a pair of members having arms and aligned openings in the ends of said arms, a pin insertable through said openings for connecting said members together, parallel walls extending entirely around said pin defining an annular groove peripherally of said pin, one of said arms being provided with a hole therethrough in alignment with said groove when said pin is in working position, and a retaining pin insertable through said arm and into said groove and extending tangentially of said groove for retaining said first named pin in working position irrespective of the angular position of said pin in said openings, said retaining pin being received entirely within said arm and being loaded in double shear.

10. A locking device for a load supporting pin, comprising a pair of members having arms and aligned openings in the ends of said arms, a pin insertable through said openings for connecting said members together, parallel walls extending entirely around said pin defining an annular groove peripherally of said pin, one of said arms being provided with a hole therethrough in alignment with said groove when said pin is in working position, and a retaining pin insertable through said arm and into said groove and extending tangentially of said groove for retaining said first named pin in working position irrespective of the angular position of said pin in said openings, the middle portion of said retaining pin engaging the first named pin in said grove, said arm and said pin together having bearing upon said retaining pin throughout its full length.

11. A locking device for a load supporting pin, comprising a pair of members having arms and aligned openings in the ends of said arms, a pin insertable through said openings for connecting said members together, parallel walls extending entirely around said pin defining an annular groove peripherally of said pin, one of said arms being provided with a hole therethrough in alignment with said groove when said pin is in working position, and a retaining pin insertable through said arm and into said groove and extending tangentially of said groove for retaining said first named pin in working position irrespective of the angular position of said pin in said openings, said retaining pin having an area of shear equal to the segment thereof between the points of its intersection with said groove.

12. A locking device for a load supporting pin, comprising a member having two arms and aligned openings in said arms, a load supporting pin insertable through said openings, parallel walls extending entirely around said pin defining an annular groove peripherally of said pin, at least one of said arms being provided with a hole therethrough in alignment with said groove when said pin is in working position, and a retaining pin insertable through said arm and into said groove for retaining said load supporting pin in working position irrespective of the angular position of said load supporting pin in said openings, said load supporting pin being freely rotatable relative to said arms while in working position, said retaining pin being loaded in double shear and having an area of shear equal to the segment thereof between the points of its intersection with said groove.

13. A locking device for a load supporting pin, comprising a pair of members having arms and aligned openings in the ends of said arms, a pin through said openings to connect said members together, parallel walls extending entirely around said pin defining an annular groove peripherally of said pin, and means extending transversely through one of said arms and engaging said groove for preventing withdrawal of said pin from said aligned openings irrespective of the angular position of said pin in said openings, said load supporting pin being freely rotatable while in working position.

14. A locking device for a load supporting pin, comprising a pair of U-shaped members, each of said members having two arms and aligned openings in the end of said arms, a load supporting pin insertable through said openings for connecting said members together, parallel walls extending entirely around said pin defining an annular groove peripherally of said pin, and means extending transversely of one of the arms of each said member and engaging through said groove for preventing withdrawal of said pin from said aligned openings irrespective of the angular position of said pin in said openings, said load supporting pin being freely rotatable while in working position.

15. A locking device for a load supporting pin, comprising a U-shaped member having two arms and aligned openings in the ends of said arms, a load supporting pin insertable through said openings, parallel walls extending entirely around said pin defining an annular groove adjacent one of its ends, a retaining pin extending transversely through one of the arms of said member and engaging in said groove for preventing withdrawal of said first named pin from said member irrespective of the angular position of said load supporting pin in said openings and permitting free rotative movement of said first pin in said openings.

16. A locking device for a load supporting pin, comprising a member having two arms and aligned openings in the ends of said arms, a load supporting pin insertable through said openings, parallel walls extending entirely around said pin defining an annular groove peripherally of said pin, an opening transversely of one of said arms in alignment with said groove when said pin is in working position, and a pin insertable through said opening and into engagement with said groove for preventing withdrawal of said first named pin from said aligned openings irrespective of the angular position of said load supporting pin in said openings, said pin being readily removable from said transverse opening as by means of a hammer and punch, said load supporting pin being freely rotatable while in working position.

LESLIE G. EHMANN.